Nov. 30, 1948.    DE LOSS D. WALLACE    2,454,982
FILTER ELEMENT

Filed May 17, 1945    2 Sheets-Sheet 1

INVENTOR
De Loss D. WALLACE
BY
his ATTORNEYS

Nov. 30, 1948. DE LOSS D. WALLACE 2,454,982
FILTER ELEMENT
Filed May 17, 1945 2 Sheets-Sheet 2

INVENTOR.
De Loss D. Wallace
BY
His ATTORNEYS

Patented Nov. 30, 1948

2,454,982

UNITED STATES PATENT OFFICE 2,454,982

FILTER ELEMENT

De Loss D. Wallace, Dayton, Ohio, assignor to General Motors Corporation, Detroit, Mich., a corporation of Delaware Application May 17, 1945, Serial No. 594,229

12 Claims. (Cl. 210—169)

This invention relates to filters and is particularly concerned with composite cleanable filters made from metal powders bonded to a strong metal support.

An object of the invention is to provide a filter element made from sintered non-compacted metal powders, which due to its construction, is cleanable.

In carrying out the above object, it is a further object of the invention to make a filter from sintered, preferably non-compacted, metal powders wherein the filter element per se is of a controlled thickness in the order of one particle of metal powder.

Further objects and advantages of the present invention will be apparent from the following description, reference being had to the accompanying drawings wherein preferred embodiments of the present invention are clearly shown.

Filters made from sintered non-compacted metal powder are well known in the art and have been used with great success and are particularly adaptable for critical filtering operations. This type of filter, however, in some cases becomes clogged and can only be cleaned by a back flow of fluid therethrough. This back flow operation is satisfactory in many installations utilizing metal powder filters but in other installations this back flow procedure is impossible. One of such instances is the use of metal powder filters in the lubricating oil lines of internal combustion engines used in automobiles and aircraft. In these cases the filtering of the oil is an important function which promotes longer life of the engine and, therefore, the filter elements heretofore have usually been discarded and replaced when they become dirty. In many uses of filters, discarding of the element is an expensive proposition and one which is difficult to carry through particularly in connection with war planes and the like where often the replacement elements are not available.

Figure 1:
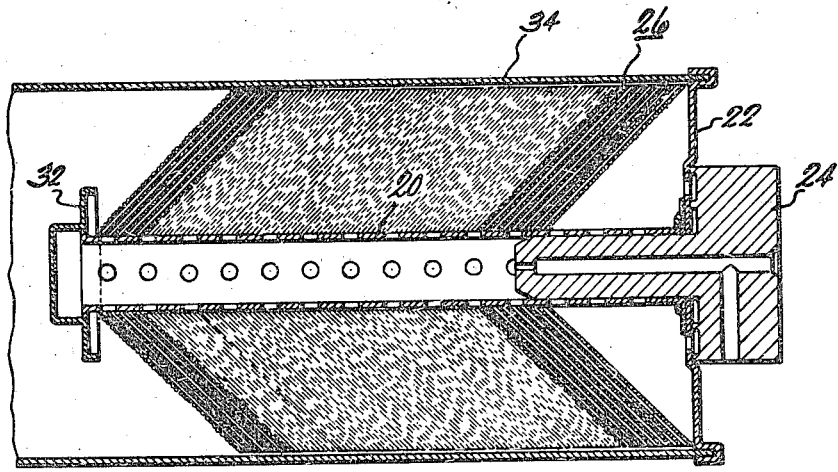
Fig. 1 illustrates in cross section one adaptation of filter plates as described in the following specification.

My improved filter provides a long flow filtering passage and eliminates the past difficulties by being easily cleanable upon disassembly of the unit. One form of the invention is shown in Fig. 1 wherein a perforated central tube 20 is provided which includes a base 22 held thereto and an oil connecting plug 24 therein. The tube 20 acts as a pilot for a plurality of conically shaped filter plates or elements 26 each of which includes a layer of steel 28 and a layer of sintered powdered metal 30 bonded thereto, to be described in more detail hereinafter. A plurality of these filter elements 26 are fitted over the tube 20 and are held in place by a cap 32. Around the outside periphery of the elements 26 is placed an outer casing 34 which fits into the base 22 and which is enclosed by a top, not shown. Oil enters through the top of the unit and then passes through the porous metal layer 30 between each of the steel plates 28 until it reaches tube 20 whereupon the oil passes through the perforations therein and is collected and returned through the fitting 24. This general construction of filter is well-known and is used in connection with cloth, paper and the like.

The peculiar construction of the filter elements per se forms the basis of my invention wherein each steel plate 28 includes a layer 30 of sintered metal powder bonded thereto. The layer 30 is made up of particles of spherical metal powder which are disposed upon the plate in a layer substantially one particle thick. Obviously there are times when more than one particle will be present but for the most part the layer is of a mono-particle type. In this manner, oil may pass between the particles and be filtered through long tortuous passages since the particles are indiscriminately positioned upon the steel part. However when the element becomes clogged, it is merely necessary to disassemble the unit and scrub each filter element with a solvent such as, gasoline and an ordinary bristle brush. In this manner, the dirt is removed from the filtering surface and the entire unit may be reassembled and again put into use. This cleaning is not possible when filtering layers of more than one particle thick are used since if the spaces between particles become clogged, it is impossible to clean such spaces from the surface of the element.

Figures 2, 3:
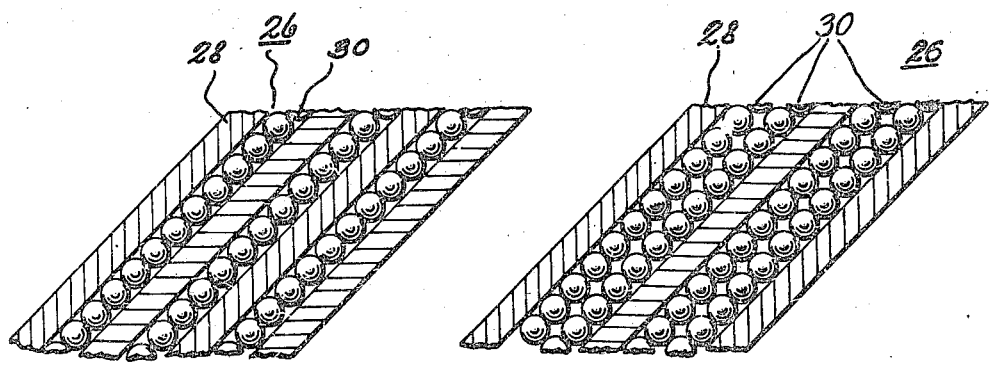
Fig. 2 is a view in cross section on a greatly enlarged scale showing the arrangement of the metal powder and the supporting plates therefor.
Fig. 3 is a view of another embodiment on a greatly enlarged scale showing a filter element which includes a filter layer two particles thick.
Figure 5:
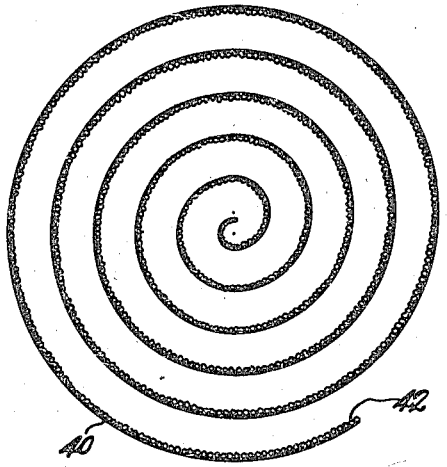
Fig. 5 is an expanded view of Fig. 4 wherein the helix is sprung open for cleaning purposes and Fig. 6 is still another embodiment of the invention showing a piece of relative softer gasket material between the filtering surfaces of two planes.
Figure 4:
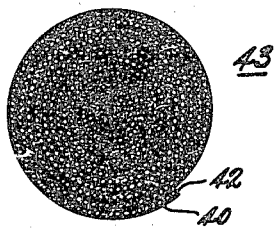
Fig. 4 is an embodiment of the invention wherein the filter is formed in a spiral or helix.
Figure 6:
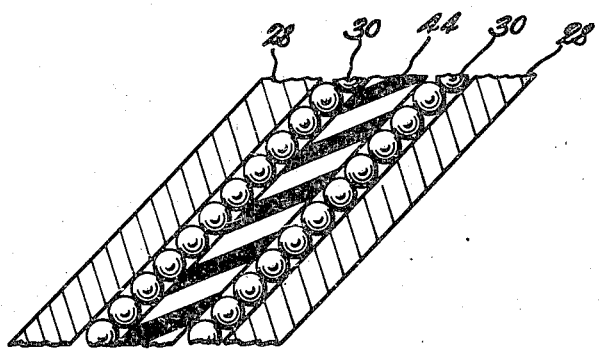

Another embodiment of the invention is shown in Fig. 3 wherein a filter layer two particles thick is utilized but where each steel plate 28 carries a layer 30 of metal particles on each side thereof so that when the plates are stacked, the filter layer is two particles thick while when disassembled, the filter layer necessary to clean is only one particle thick.

In the manufacture of filter elements of this type the prior art may be referred to, however, for the sake of clarity, a brief description of a bronze filter is as follows. Spherical, constituent rich surface metal particles having a copper core and a tin rich surface thereon are placed on a sheet of steel. The particle size of the powder may range between any desired limits although 75 to 150 mesh powder is usually suitable. The layer is obtained such as by using a predetermined weight of powder for each square inch of surface and distributing the powder by manipulation thereof with a trowel-like instrument etc. until it is substantially one particle thick whereupon the steel sheet with metal particles disposed thereon is heated in a sintering furnace at a temperature of between 1500° F. and 1700° F. for from 20 minutes to a half hour under non-oxidizing conditions. During this period the tin in the tin-rich surface of the metal particles alloys with the copper in the heart of the particles to form a bronze which during the sintering period becomes substantially homogeneous throughout. The element is then cooled under non-oxidizing conditions and may next be run through sizing rolls to cause the layer to be of substantially uniform thickness. In this manner, some of the high points which may be present, can be compressed, due to the ductility of the material. Sizing steps may or may not be necessary according to the particular application of the filter. If a layer of metal powder is to be placed on the opposite side of the sheet the procedure should be repeated with the sintering taking place at the lower end of the sintering range, that is, around 1500° F. Obviously if a metal powder layer is placed on both sides of the sheet, the sizing operation may be carried out in a single step.

Instead of using pre-alloyed metal powder, mixtures of the component metal powders may be utilized such as mixtures of tin and copper powders. Likewise porous layers of other metals than bronze may be used, for example, copper and iron, iron, copper and nickel, etc. Examples of constituent rich surface metal powders and alloying methods are described in the Olt Patent 2,273,589 and examples of composite filter elements are disclosed in the Truxell et al. Patent 2,297,817.

Thus it should be understood that the present invention is directed to an article wherein the filter layer or porous metal layer is substantially only one particle thick.

Obviously other embodiments of the invention may be utilized such as, coiled strips of metal 40 having a single particle porous layer 42 thereon which coils may be sprung open for cleaning or the strip may be wound into a helix 43 which may be opened for cleaning. Likewise a softer gasket material 44 may be used to contact the porous metal which is interposed between the porous layers 30 on the steel 28. In other words the particular application of the filter element forms no part of this invention which is directed entirely to the use of a single particle thick filter layer regardless of how it is used.

In some instances, it may be desirable to use a porous metal layer which is not bonded to steel but which is mechanically supported by the strong metal plates. In this case the metal powder would be spread upon a graphite sheet and sintered thereon whereupon it may be removed and made into parts of the desired shape. It is apparent that a sheet of this type is quite fragile which must be handled with care. Manufacture of filters without a steel backing is disclosed in the Davis Patent No. 2,157,596.

It is manifest that instead of a steel plate as a supporting element, any other strong metal may be utilized which will not melt at the sintering temperatures, for example, copper, nickel, iron, various steel alloys or other alloyed metals which are satisfactory for the intended use.

When using metal powder of 150 mesh or larger it is possible if desired to compact or briquette the powder prior to sintering in order to control the porosity thereof. Such a step is within the scope of my invention. Such briquetting should be carried out with pressures that will permit the desired fluid flow through the completed filter.

Powder having a particle size ranging from 50 mesh upwards may be used whereby the flow through the filter will be regulated to a large degree by the size of the metal powder particles.

While the embodiments of the present invention as herein disclosed, constitute preferred forms, it is to be understood that other forms might be adopted, all coming within the scope of the claims which follow.

What is claimed is as follows:

1. A new article of manufacture comprising a filter element, consisting of, a strong metal backing plate having bonded thereto a layer of sintered non-compacted spherical metal powder one particle thick throughout its entire extent, each particle of metal powder being in abutting engagement with adjacent particles.

2. The article claimed in claim 1 wherein the filter element is bronze.

3. The article claimed in claim 1 wherein the filter element is copper-nickel alloy.

4. The article claimed in claim 1 wherein the filter element is made of ferrous metal.

5. A new article of manufacture comprising, a filter element consisting of; a strong metal supporting plate having a layer of non-compacted sintered spherical metal powder bonded to each side thereof, each of said layers being one particle thick, each particle of metal powder being in abutting relation with adjacent particles.

6. The article claimed in claim 5 wherein the layers of metal powder are bronze.

7. The article claimed in claim 5 wherein the layers of metal powder are copper-nickel alloy.

8. The article claimed in claim 5 wherein the layers of metal powder are ferrous metal.

9. A new article of manufacture comprising, a filter element consisting of; a layer of sintered metal powder fabricated from spherical metal powder particles of 150 mesh size or larger, said particles being sintered in a layer only one particle thick throughout its extent, each particle of powder being in abutting relation with adjacent particles.

10. A new article of manufacture comprising, a filter of at least three strata consisting of two layers of substantially non-porous material having interposed therebetween a layer of sintered metal powder which is one particle thick throughout its extent, said layer being fabricated from spherical metal powder particles of 150 mesh size or larger wherein each particle of metal powder abuts adjacent particles.

11. A new article of manufacture comprising, a filter element consisting of a strong metal support carrying a filter layer of spherical metal powder which is sintered together at points of tangency between metal powder particles, said filter layer being one particle thick throughout its extent and being formed from spherical metal powder particles having a mesh size of from 50 to 150.

12. An edge type filter comprising a plurality of filter elements arranged in abutting relationship with one another, each of said filter elements consisting of a strong metal support carrying an integral filter layer thereon, said filter layer being made of a single layer of spherical metal powder wherein each particle of powder abuts adjacent particles and is bonded to adjacent particles and to the strong metal support through the medium of a metallurgical bond and means for causing a flow of fluid to be filtered through channels formed between the strong metal supports by the single layer of sintered metal powder whereby the suspended particles too large to pass through said channels will be separated from the remainder of the fluid.

DE LOSS D. WALLACE.

REFERENCES CITED

The following references are of record in the file of this patent:

UNITED STATES PATENTS

| Number | Name | Date |
| --- | --- | --- |
| 1,646,404 | Herbert | Oct. 25, 1927 |
| 1,677,892 | Herbert et al | July 24, 1928 |
| 2,157,596 | Davis | May 9, 1939 |
| 2,220,641 | Davis | Nov. 5, 1940 |
| 2,267,918 | Hildabolt | Dec. 30, 1941 |
| 2,273,589 | Olt | Feb. 17, 1942 |
| 2,297,817 | Truxell, Jr. et al | Oct. 6, 1942 |
| 2,327,805 | Koehring | Aug. 24, 1943 |